(12) United States Patent
Sensen et al.

(10) Patent No.: US 6,702,563 B2
(45) Date of Patent: Mar. 9, 2004

(54) EXTRUDER DIE HEAD

(75) Inventors: Klemens Sensen, Lengerich (DE); Juergen Linkies, Lienen (DE); Dieter Aus Dem Moore, Hoerstel (DE); Reinmut Rewwer, Bohmt (DE); Frank Bosse, Tecklenburg (DE)

(73) Assignee: Windmöller & Hölscher, Lengerich (DE)

( * ) Notice: Subject to any disclaimer, the term of this patent is extended or adjusted under 35 U.S.C. 154(b) by 0 days.

(21) Appl. No.: 09/577,616

(22) Filed: May 25, 2000

(65) Prior Publication Data

US 2003/0026868 A1 Feb. 6, 2003

(30) Foreign Application Priority Data

May 25, 1999 (DE) .......................... 199 23 973

(51) Int. Cl.[7] .............................. B29C 47/06
(52) U.S. Cl. .............. 425/133.1; 425/192 R; 425/380; 425/462; 425/467
(58) Field of Search .............. 425/133.1, 190, 425/192 R, 380, 462, 467

(56) References Cited

U.S. PATENT DOCUMENTS

| 4,167,383 A | * | 9/1979 | Murakami et al. .......... 425/462 |
| 4,185,954 A | * | 1/1980 | Murakami et al. .......... 425/462 |
| 5,069,612 A | * | 12/1991 | Teutsch et al. .......... 425/133.1 |
| 5,076,776 A | * | 12/1991 | Yamada et al. .......... 425/133.1 |
| 5,690,972 A | * | 11/1997 | Planeta et al. .......... 425/133.1 |
| 5,738,881 A | * | 4/1998 | Sagar .................. 425/133.1 |
| 5,984,657 A | * | 11/1999 | Bentivoglio .......... 425/133.1 |

FOREIGN PATENT DOCUMENTS

| EP | 0 568 544 | 11/1993 |
| WO | 98/00283 | 1/1998 |

* cited by examiner

Primary Examiner—Robert Davis
Assistant Examiner—Joseph S Del Sole
(74) Attorney, Agent, or Firm—Jacobson Holman PLLC

(57) ABSTRACT

An extruder die head for producing multilayered tubes made of thermoplastic material exhibits a central annular channel, which is provided with an annular outlet die. Into the outer limiting wall of the channel empty annular slits, which feed a polymer melt and which constitute the smaller diameter openings of truncated channels, formed between the internal and external shells of stacked, conical insert members. To reduce the axial length of the extruder die head, the annular slits, feeding the polymer melts, also empty into the inside wall of the central annular channel. The annular slits are the smaller diameter openings of truncated channels, formed between the internal and external shells of stacked conical internal insert members.

11 Claims, 2 Drawing Sheets

EXTRUDER DIE HEAD

BACKGROUND OF THE INVENTION

1. Field of the Invention

The present invention relates to an extruder die head, preferably a blown film head, comprising a central annular channel, which is provided with an annular outlet die and into whose outer limiting wall empty annular slits, which feed a polymer melt and which constitute the smaller diameter openings of truncated channels, formed between the internal and external shells of stacked, conical insert members.

2. Related Art

EP 0 568 544 B1 discloses an extruder head for extruding multi-layered thermoplastic pipes of the kind described above, whose central annular channel is defined by a central mandrel, whose shell forms the inside wall of the channel, and by stacked conical insert members, which enclose the channel and whose inside openings form the outer wall of the central annular channel. In this prior art extruder heads a truncated-channel is formed between two bell shaped or conical insert members, which are provided with a radial feed borehole for the polymer melt, For each tubular layer of polymer melt to be extruded there are two conical insert members, which are stacked one over the other. The space between these insert members forms the annular slits. The insert members are held together by these clamping cover parts, which are connected together with tightening screws. The prior art extruder die head exhibits a significant overall length, when multilayered pipes are to be produced. However, such long extruder die heads exhibit the drawback that the large height of the extruder die head results in long flow paths for the polymer melt. These paths in turn result in high Theological stress at the melt interfaces, a state that can lead to unstable flow behaviour. In particular, the long flow paths are a problem with polymer melts that cannot tolerate heating for a prolonged period of time. Such polymer melts decompose and become brittle when heated for long periods.

SUMMARY OF THE INVENTION

Therefore, the object of the invention is to provide an extruder die head of the class described in the introductory part. This extruder die head facilitates the extrusion of plastic tubes with arbitrary layers, but is characterized by a significantly shorter construction height.

The invention solves this problem in that the annular slits, feeding the polymer melts, also empty into the inside wall of the central annular channel. The annular slits are the smaller diameter openings of truncated channels, formed between the internal and external shells of stacked conical internal insert members.

It is also easy to build the extruder die head of the invention in modules. A number of conical insert members are stacked until the desired number of layers of the extruded tube is reached. While maintaining the same number of conical feed channels, thus the same number of extruded tubular layers, it is possible to make the extruder die head of the invention half the construction length of the prior art extruder die head, because, based on the length of the conical insert members, two annular slits that feed the polymer melt can empty into the central annular channel. The significantly reduced axial length of the extruder die head of the invention results in an improved flow pattern of the melt that is fed in and less heat stress on the melt, because the melt spends correspondingly less time in the extruder die head.

The overall length of the extruder die head of the invention can be further reduced in that the internal and external shells of each insert member define the truncated channels for feeding the polymer melts into the central annular channel. In contrast to the prior art extruder die head, this design reduces the size of the conical insert members to half of their former size so that the overall length is correspondingly shortened.

The internal and external annular slits, which empty into the central annular channel, can lie in the same radial planes, Of course, it would also be possible to move the annular slits axially.

Preferably the internal and external shells of the conical insert members are two counter rotating spiral channels, whose depth tapers off in the direction of the opening. This design off the channels, wherein the melt overflows the channels in the axial direction, is well known.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

The invention is explained in detail with reference to the following drawings.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
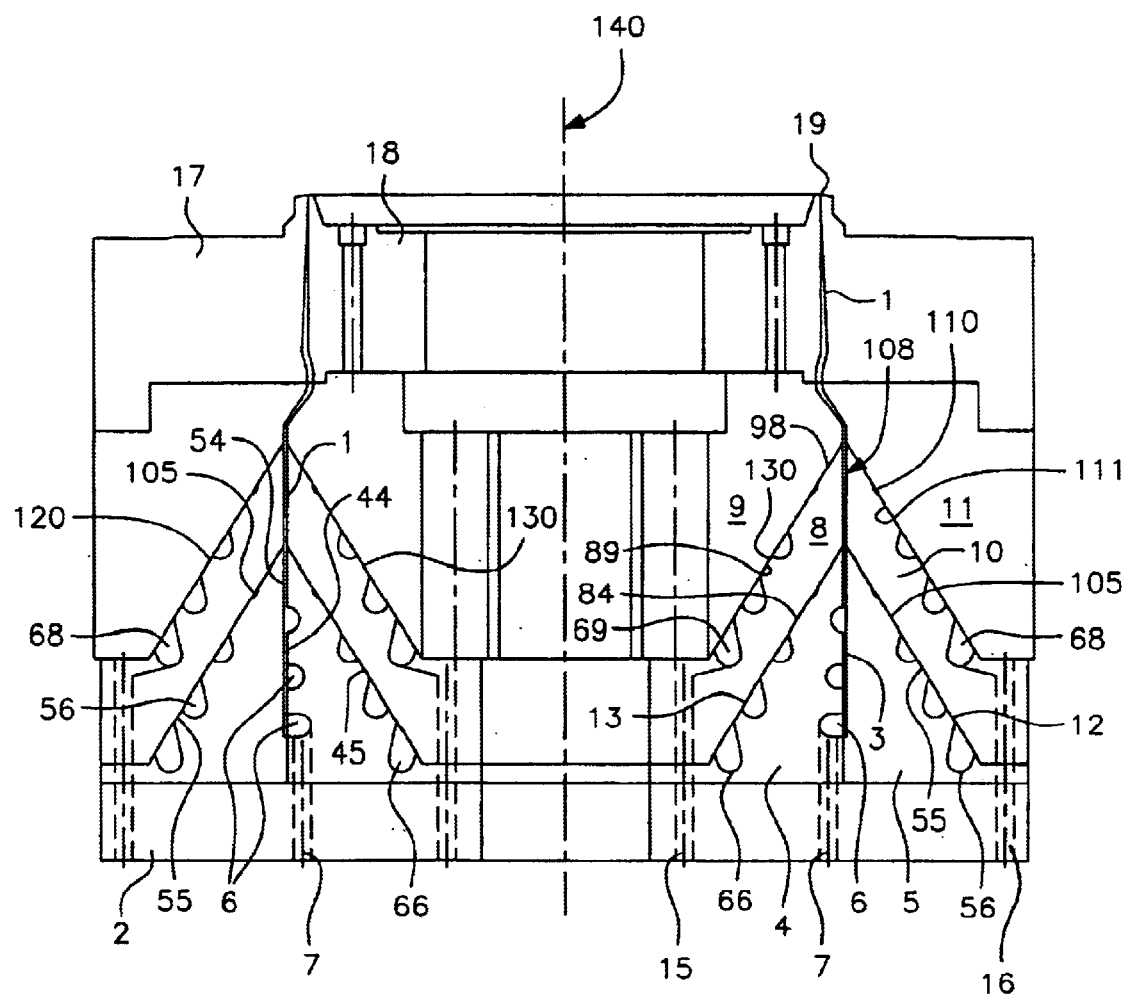
FIG. 1 is a cross sectional view of a blown film die head with annular or conical channels, feeding five different melts.

FIG. 1 is a schematic drawing of a sectional view of a blown film die head, where five annular or conical channels, which feed different types of polymer melts, empty into a central annular channel 1.

The blown film die head comprises a bottom annular cover 2, which serves to hold conical insert members that are stacked on the cover 2, and top holding rings 17, 18. The conical insert members include inside rings 4, 8, 9 and corresponding outside rings 5, 10, 11. The inside bottom ring 4 has a cylindrical outer wall 44 and a conical inner wall 45. The walls 44, 45 have spiral grooves 6, 66, respectively, whose depth tapers progressively toward the top of the groove. The outside bottom ring 5 has a cylindrical inner wall 54 and a conical outer wall 55. Only conical outer wall 55 has a spiral groove 56. The rings 4 and 5 exhibit a triangular cross section and the bases of the bottom rings 4, 5 are screwed or clamped together with the bottom cover 2 in a manner that is not illustrated here. The inside bottom ring cylindrical outer wall 44 and the outside bottom ring cylindrical inner wall 54 define the cylindrical feed channel 3, and the spiral groove 6 becomes slotted helical passages which are indicated by the three grooves 6. Channels 7, feeding a first polymer melt, empty into the bottom of helical passage 6.

Stacked on the bottom rings 4, 5, which lie in a common plane, are inner middle conical ring 8 and outer middle conical ring 10. The middle conical rings 8, 10 together with the bottom rings 4, 5 define conical melt feed channels 12, 13 which have spiral passages 56, 66. The conical feed channels are formed by an inner middle ring outer wall 84 with the inner bottom ring inner wall 45, and by an outer middle ring inner wall 105 with the outer bottom ring outer wall 55. These conical melt feed channels 12, 13 empty into a central annular channel 1, which is a continuation of the cylindrical feed channel 3 formed between the inside and outside cylindrical shell areas or walls, generally indicated by 108, of the middle rings 8, 10. The conical external shells of the bottom rings 4, 5 have in turn spiral grooves 66, 56, respectively, whereby the melt feed channels (not illustrated here) empty into the bottom grooves having the greatest depth.

Mounted on the middle conical rings 8, 10 are inner top conical ring 9 and outer top conical ring 11 which define, with the conical external shell areas of the middle rings, melt feed channels 120, 130. The conical feed channels 130, 120 are formed by an inner middle ring inner wall 89 with an inner top ring outer wall 98, and by an outer middle ring outer wall 111 with an outer top ring inner wall 110, respectively. Conical melt feed channels 130, 120 empty into the central annular channel 1. The external shell areas or walls of the middle rings 8, 10 have spiral grooves 69, 68, respectively, whose depth tapers off toward the top, on the inner middle ring inner wall 89 and on the outer middle ring outer wall 111.

The internal truncated conical annular melt feed channels 13, 130 and the external truncated conical annular melt feed channels 12, 120 slope in opposite directions at approximately the same angle to the central annular channel 1. The external and internal channels 120, 130 communicate with the central annular channel 1 in approximately the same radial plane. Also, the external and internal channels 12, 13 similarly communicate with the central annular channel 1. The internal 13, 130 and external 12, 120 melt feed channels are substantially concentrically spaced around the central annular channel 1. The bottom grooves with the greatest depth are fed by the melt feeding channels 15, 16.

Mounted on the top conical rings 9, 11 are top outside and inside holding rings 17, 18 between which the central annular channel 1 is defined with an annular outlet slit 19. An easy method for assembling the blown film die head together with the bottom cover 2 is to connect the top holding rings 17, 18 with tightening screws.

The inside rings 4, 8, 9 and the bottom cover 2 exhibit aligned axial passages, which form a passage channel 140 which houses the lines to feed in and exhaust the blowing air for the blown film die head.

Figure 2:
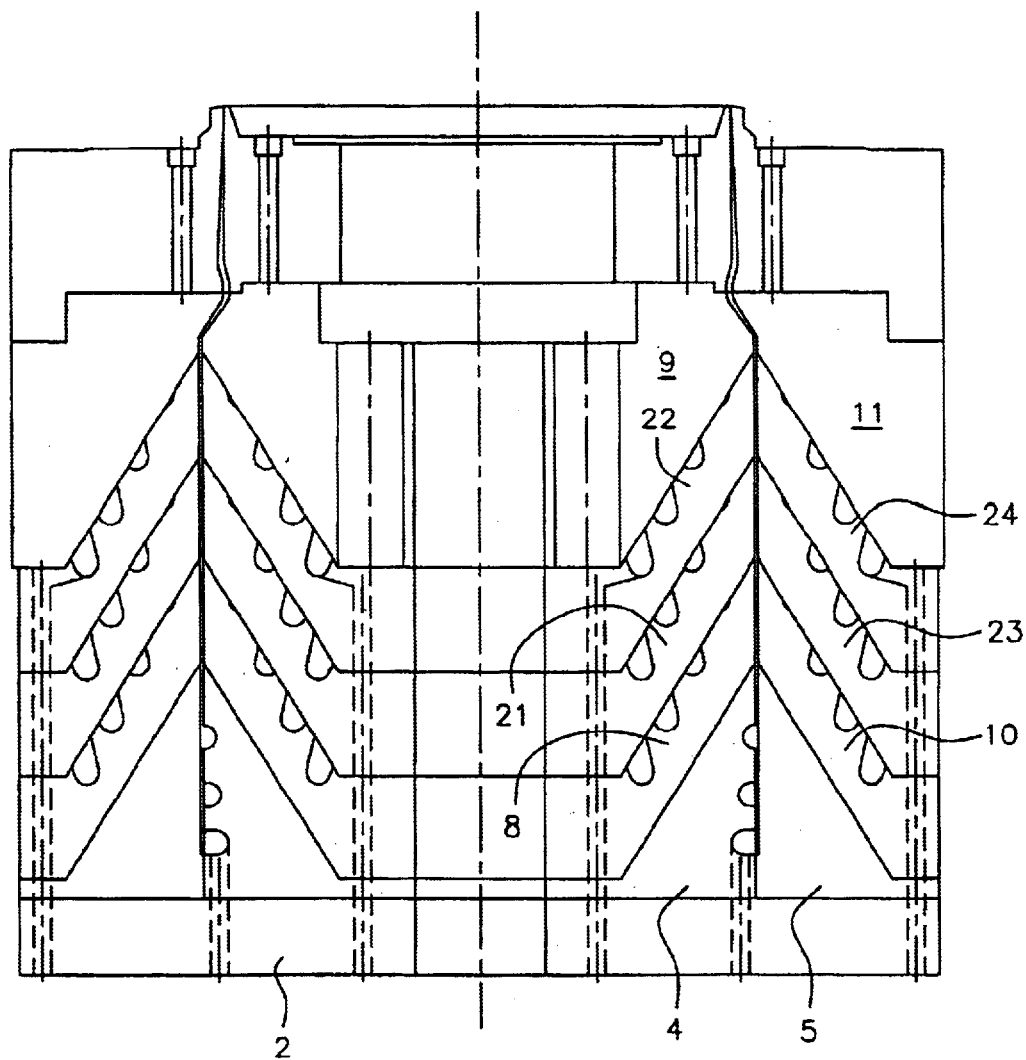
FIG. 2 is a sectional view of a blown film die head with annular or conical channels, feeding nine different melts.

The blown film die head, shown in FIG. 2, exhibits in principle the same construction, as described with reference to FIG. 1. The distinction between it and the blown film die head, depicted in FIG. 1, lies only in the fact that between the inside and outside middle conical rings 8, 10 and the top inside and outside rings 9, 11 there are additional inside conical rings 21, 22 and additional outside conical rings 23, 24, which are designed analogously to the middle rings 8, 10. This arrangement of the additional conical rings makes it possible to feed, not five melts, but nine different melts with the blown film die head of FIG. 2 for the purpose of producing a nine layered plastic tube.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An extruder die head, comprising a central annular channel defined by an inside wall and an outside wall, which is provided with an annular outlet die slit, and into said inside and outside walls empty internal and external annular slits, respectively, which feed polymer melts and which form smaller diameter openings of truncated channels, formed between internal and external shells of stacked, conical insert members, said annular slits feeding said polymer melts from said truncated channels into said inside and outside walls defining said central annular channel, and said internal and external shells of said conical insert members, respectively, having mating interior and mating exterior conical surfaces which define two counter rotating spiral channels, whose depths taper off in a direction of said annular outlet die slit, said conical insert members including an inside bottom ring and an outside bottom ring, said inside bottom ring having a cylindrical outer wall and a conical inner wall, and said outside bottom ring having a cylindrical inner wall and a conical outer wall, said cylindrical walls being in abutment to define therebetween a feed channel communicating with said central annular channel, and said inside bottom ring and said outside bottom ring having a generally triangular cross-section.

2. The extruder head, as claimed in claim 1, wherein a first one of said spiral channels is formed on said conical outer wall of said outside bottom ring, and a second one of said spiral channels is formed on said conical inner wall of said inside bottom ring.

3. The extruder head, as claimed in claim 1, wherein corresponding pairs of said internal and external annular slits lie in a same radial plane.

4. The extruder head, as claimed in claim 1, wherein said spiral channels further include spiral grooves on said cylindrical outer wall of said inside bottom ring.

5. An extruder die head, comprising:

a plurality of external conical insert members stacked upon one another to form an outside wall, mating surfaces of adjacent external conical insert members forming outer truncated conical melt feed channels that feed polymer melts emptying into said outside wall;

a plurality of internal conical insert members stacked upon one another to form an inside wall, mating surfaces of adjacent internal conical insert members forming inner truncated conical melt feed channels that feed polymer melts emptying into said inside wall;

said inside wall and said outside wall defining therebetween a central annular channel opening into an annular outlet die slit;

said plurality of internal conical insert members including an inside bottom ring having a cylindrical outer wall and a conical inner wall, said cylindrical and conical walls having first and second spiral grooves therein, respectively; and said plurality of external conical insert members including an outside bottom ring having a cylindrical inner wall and a conical outer wall having third spiral grooves therein that counter-rotate with said second spiral grooves, said cylindrical inner wall in abutment with said cylindrical outer wall of said inside bottom ring to define a feed channel therebetween in communication with said central annular channel.

6. The extruder die head as claimed in claim 5, wherein said plurality of external conical insert members and said plurality of internal conical insert members are in alignment to form corresponding pairs, each corresponding pair lying in a common radial plane, respectively.

7. The extruder die head as claimed in claim 5, wherein said internal truncated conical channels and said external truncated conical channels slope in opposite directions at approximately a same angle to said central annular channel.

8. The extruder die head as claimed in claim 5, wherein a depth of said first, second and third spiral grooves tapers off in a direction toward said central annular channel.

9. The extruder die head as claimed in claim 5, wherein said internal and external truncated conical channels are substantially concentrically spaced around said central annular channel.

10. The extruder die head as claimed in claim 5, wherein said mating surfaces of said adjacent external conical insert members and said mating surfaces of said adjacent internal conical insert members include spiral grooves.

11. The extruder die head as claimed in claim 5, wherein said inside and outside bottom rings have a triangular cross-section.

* * * * *